(12) United States Patent
Kozlay

(10) Patent No.: US 7,480,637 B2
(45) Date of Patent: Jan. 20, 2009

(54) INTERNET TRANSACTION AUTHENTICATION APPARATUS, METHOD, AND SYSTEM FOR IMPROVING SECURITY OF INTERNET TRANSACTIONS

(75) Inventor: Douglas Kozlay, Timonium, MD (US)

(73) Assignee: Biometric Associates, LP, Timonium, MD (US)

( * ) Notice: Subject to any disclaimer, the term of this patent is extended or adjusted under 35 U.S.C. 154(b) by 74 days.

(21) Appl. No.: 11/317,141

(22) Filed: Dec. 23, 2005

(65) Prior Publication Data
US 2007/0150419 A1    Jun. 28, 2007

(51) Int. Cl.
*G06F 17/60* (2006.01)
(52) U.S. Cl. .............................. 705/67; 705/50; 713/186
(58) Field of Classification Search .................. 705/67, 705/50; 713/186
See application file for complete search history.

(56) References Cited

U.S. PATENT DOCUMENTS

| 6,681,328 B1 | 1/2004 | Harris et al. |
| 6,808,111 B2 | 10/2004 | Kashef et al. |
| 6,950,939 B2 | 9/2005 | Tobin |
| 2005/0165700 A1* | 7/2005 | Karthik .................. 705/67 |
| 2006/0123465 A1* | 6/2006 | Ziegler .................... 726/2 |

FOREIGN PATENT DOCUMENTS

JP    2006127178 A  *  5/2006

\* cited by examiner

*Primary Examiner*—Pierre E Elisca
(74) *Attorney, Agent, or Firm*—Nixon & Vanderhye P.C.

(57) ABSTRACT

An Internet Transaction Authentication (ITA) is a customer authentication apparatus disclosed herein. One embodiment employs an enclosure with USB interface capability; a second embodiment employs a similar enclosure with local wireless connectivity. ITA apparatuses achieve two important authentication goals: (1) Cryptographic authentication of websites to customers by providing real-time website validity confirmation so customers know when they've reached legitimate websites (i.e., visual, audible and displayed confirmation); (2) the ITA authenticates customer fingerprint (s) and, if verified, cryptographically authenticates customers to websites to prevent imposters from attempting transactions. Instead of making online transactions under control of programs in the customer PC, the ITA performs the complete transaction using biometric user authentication and strong cryptographic device authentication, all provisioned entirely within the ITA, itself. Transactions are cryptographically encapsulated for uninterruptible end-to-end transport between the ITA and websites and/or financial intermediaries. This arrangement provides a "Card Present" level of transaction security.

24 Claims, 4 Drawing Sheets

Note: The path numbers ① refer to the data communications paths in Figure 5.

Transaction Flow Sequence for Authentication followed by Credit Card Transaction

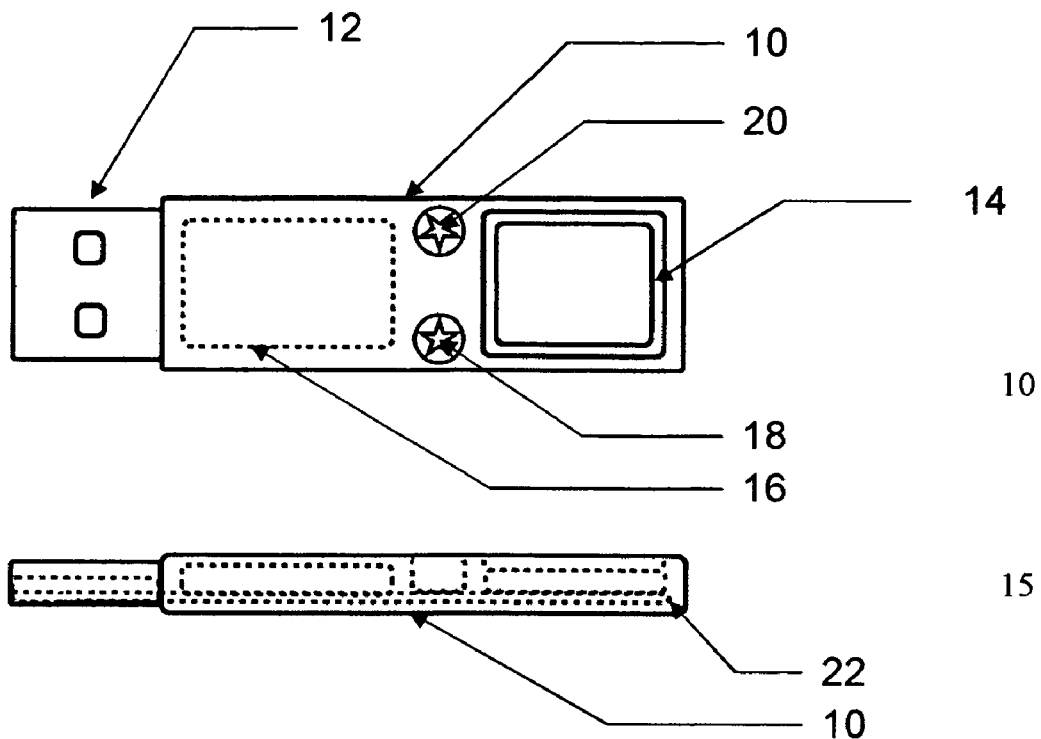
Figure 1A, Internet Transaction Authenticator in USB Dongle Form
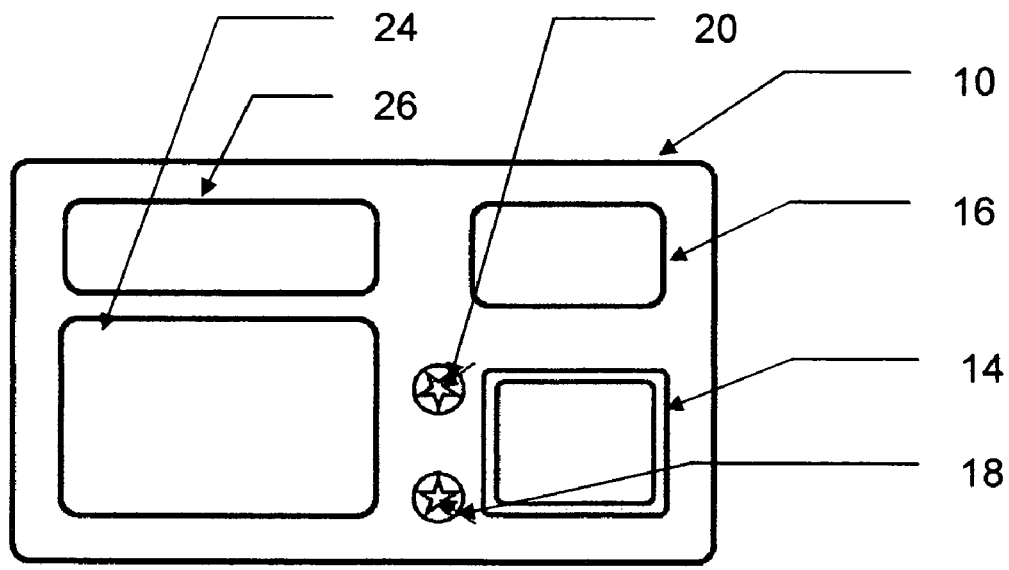
Figure 1B, Internet Transaction Authenticator in Wireless Card Form

Model in which Merchant or Financial Institution Performs Authentication
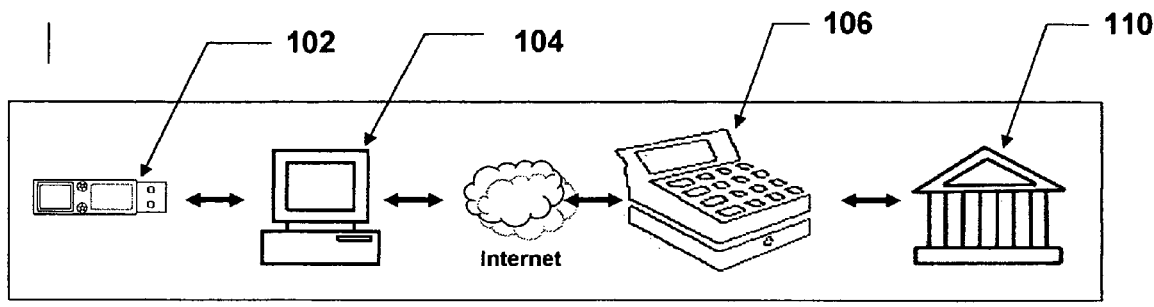
FIG. 2, Transaction Flow between ITA, Merchant, and Financial Processing
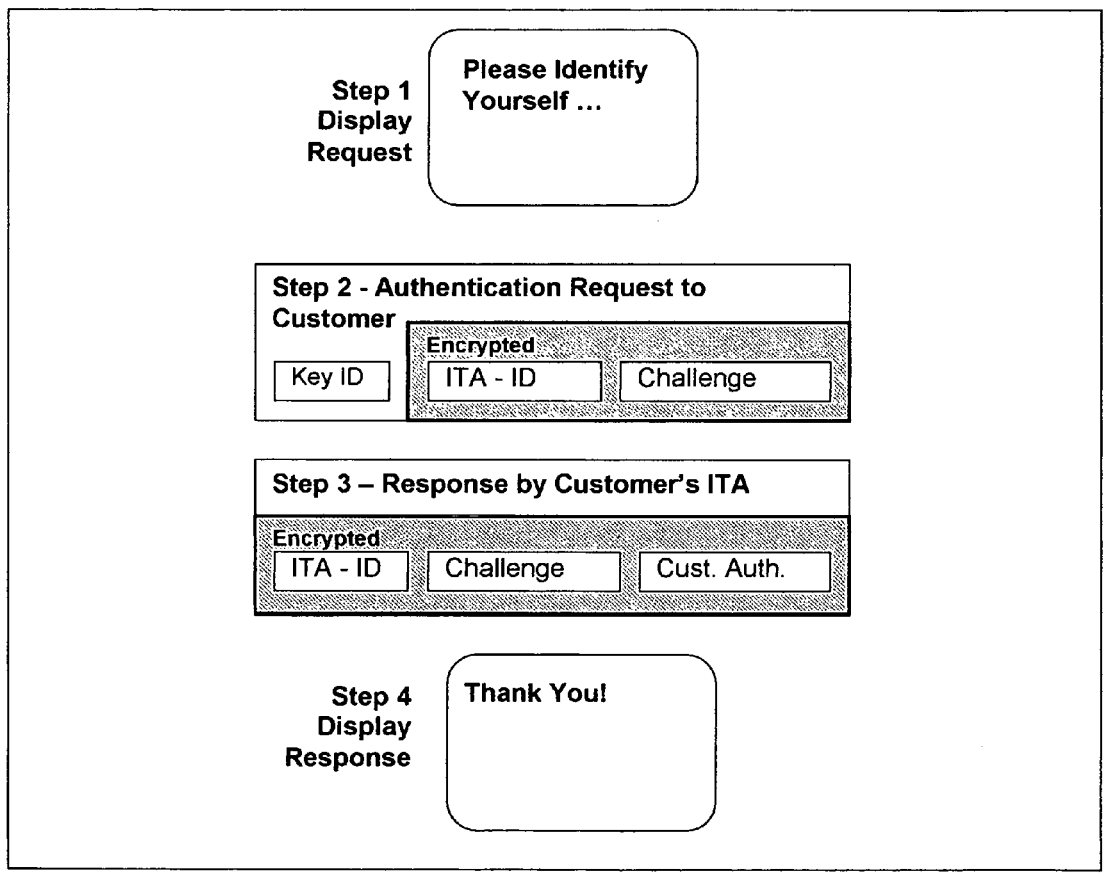
FIG. 3, Simple Example of Transmission Data

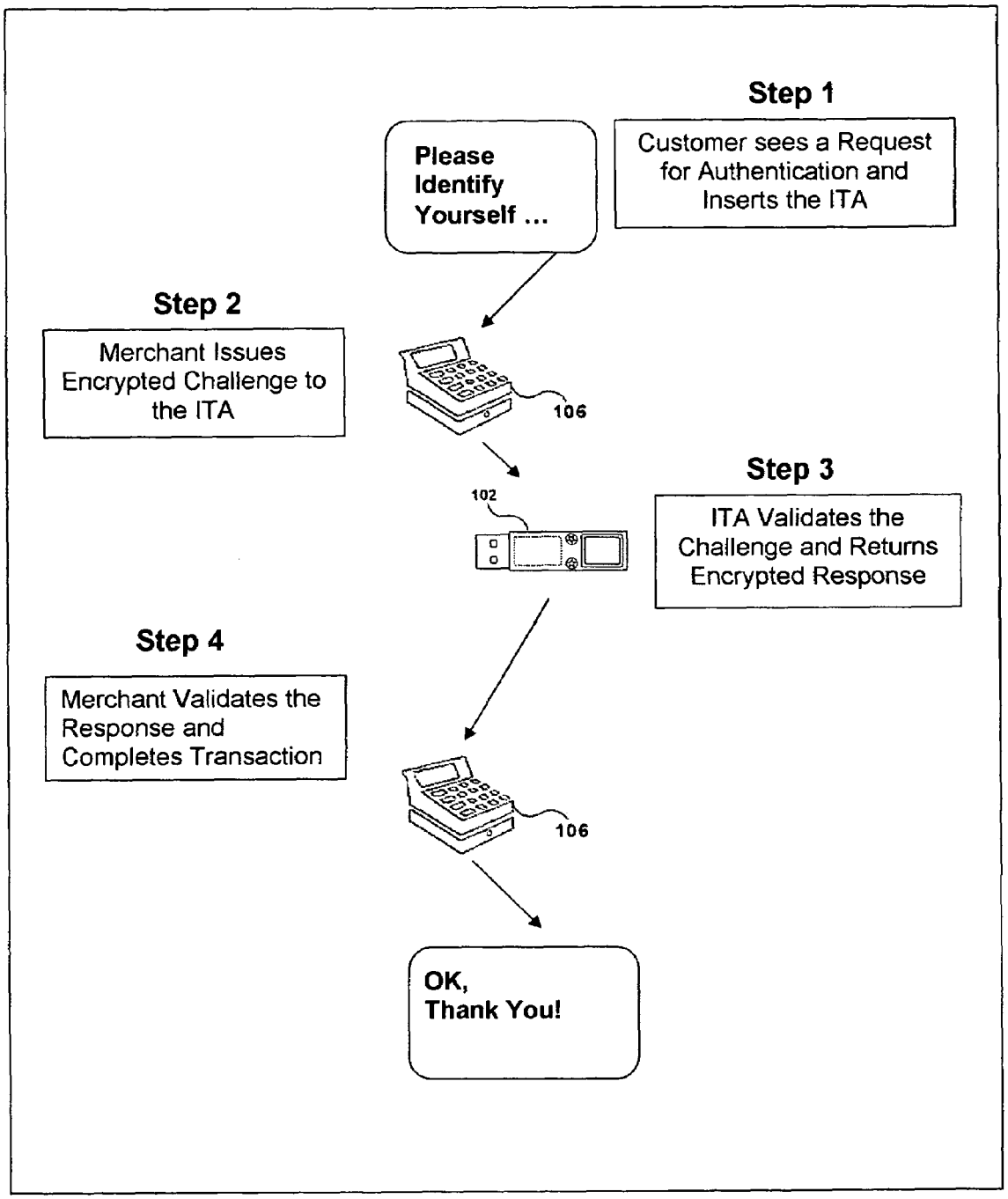
Figure 4, Simple Example of Payment Transaction Flow Chart

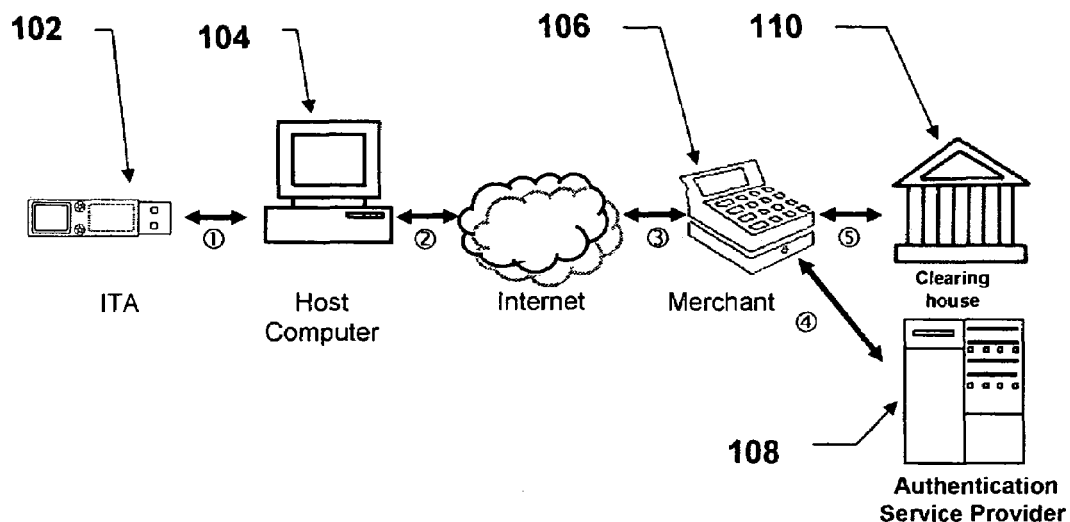

Model in which Authentication Service Provider Authenticates Customer

FIG. 5, Transaction Flow with an Authentication Service Provider

| Step | Path | ITA Reference: 102 | Host Reference: 104 | Merchant Reference: 106 | Authenticator Reference: 108 | Clearinghouse Reference: 110 |
|---|---|---|---|---|---|---|
| 1 | ②-③ | | | ←- - -→ | → | |
| 2 | ①-④ | | ← | | | |
| 3 | ④-① | | → | | | |
| 4 | ④ | | | | ← | |

Note: The path numbers ① refer to the data communications paths in Figure 5.

FIG. 6, Transaction Flow Sequence for Simple Logon Authentication

| Step | Path | ITA Reference: 102 | Host Reference: 104 | Merchant Reference: 106 | Authenticator Reference: 108 | Clearinghouse Reference: 110 |
|---|---|---|---|---|---|---|
| 1 | ②-③ | | | ←- - -→ | → | |
| 2 | ④-① | | ← | | | |
| 3 | ①-④ | | → | | | |
| 4 | ④ | | | | ← | |
| 5 | ② | | | ←- - - | - - - | -→ |
| 6 | ⑤ | | | | | → |

Note: The path numbers ① refer to the data communications paths in Figure 5.

FIG. 7, Transaction Flow Sequence for Authentication followed by Credit Card Transaction

INTERNET TRANSACTION AUTHENTICATION APPARATUS, METHOD, AND SYSTEM FOR IMPROVING SECURITY OF INTERNET TRANSACTIONS

BACKGROUND OF THE INVENTION

1. Field of the Invention

The field of the invention is transaction authentication and security for online, internet, and other communicated transactions, more particularly, the invention relates to fingerprint authentication of a user or customer at transaction time using a mobile customer authentication apparatus (which is also referred to as an Internet Transaction Authentication (ITA)). The ITA cryptographically assures the identity of a website to a customer and biometrically assures the identity of customer to a website. An ITA is typically connected into any standard (e.g., USB) interface when web access is desired. The ITA is enabled only after the user (customer) authenticates themselves to the ITA.

2. Related Art

While there are numerous and diverse products implementing fingerprint sensor devices, the undersigned has not located any equivalent art which consolidates and integrates all aspects of the authentication in one portable equal to the present invention. Notwithstanding, it must be noted that other transaction authentication mechanisms and protocols are well known in the industry, e.g., EMV (Europay Mastercard Visa) or SET (secure electronic transactions) protocol, are utilitarian and functional, their functions are distributed or shared for some authentication applications, however, these are carried out within the user's computer or in within the merchant's computer, teller machine, or other vendor authentication resource. Token devices such as smartcards are only used to perform the cryptographic operations or retain the user's identity.

U.S. Pat. No. 6,681,328 to Harris, et al discloses a method for verifying the identity of a customer using a central switch to request the ID of a user by means of standard formats such as EMV or SET. However, unlike the present invention, the patent does not disclose an integrated hardware apparatus that incorporates all user authentication functions as well as provide local transaction functions within a mobile, portable device, nor does the patent mention biometrically authenticating users, nor does it disclose providing service for "contact" and "contactless" applications.

U.S. Pat. No. 6,808,111 to Kashef, et al discloses a terminal for accepting a smartcard. The present invention, by contrast, does not use smartcards or smartcard reading terminals at all. Additionally, the patent does not discuss biometric authentication of customers, nor does it describe a means for integrating all the necessary authentication functions into an integrated customer authentication apparatus.

By contrast, in the present invention, all of the following are performed within the ITA device itself: biometric authentication of a user and display of authentication results; cryptographic verification of external system(s); cryptographic encapsulation of the authentication data sent to the external system(s); and positive identification of the ITA itself.

In U.S. Pat. No. 6,950,939 to Tobin a means for carrying out transactions on a memory device is disclosed, such as a smartcard. However, biometric authentication on the device is not claimed. Further, the Tobin device neither indicates to the customer that biometric authentication is successful, nor does the device indicate that the accessed website is valid and recognized.

Necessity of the Invention:

It is well-known that even as security technologies evolve forward, simultaneously, security challenges are substantially increasing. This is particularly so regarding financial transactions (e.g., online transactions and purchases; other monetary transactions such as ticket purchases at kiosks; PC-centric transactions such as money-related email communications; etc.).

Two very damaging types of internet fraud have befallen customers of websites owned by banks, online stores, and investment companies: In the first case, "cloned"(fraudulent but appearing legitimate) websites are created by technologically sophisticated criminals and held out as genuine websites. Unsuspecting customers are directed to criminals' websites by spam or weblink misdirection; customers naively enter sensitive personal data into password login fields and/or order entry screens with credit card payment fields. The internet criminals then harvest the ill-gotten data and use it in many destructive ways. In the second case, an imposter uses customer PINs or passwords stolen as described above, or by a Trojan Horse program (e.g., B02K or Sub7), or by "data-interception-by-remote-transmission" technique or by communication "sniffing", or by hacking into account password databases, etc. Regardless how the stolen data is obtained, the perpetrator executes illegitimate transactions to sell stock, empty a bank account, or make unauthorized purchases.

Accordingly, any personal apparatus for improving security and safety of online transactions by biometrically assuring customer identity and by cryptographically authenticating legitimate websites should be welcome in the art.

Objects of the Invention:

It is one primary object of the present invention, to provide a personal, mobile, portable Internet Transaction Authentication (ITA) peripheral apparatus capable of improving security of online transactions. It is a related primary object, to provide a secure identification device which uses fingerprint biometrics to authenticate an authorized customer, and which uses strong cryptography to reduce the risk of fraud. It is another object to provide an ITA which provides visual and/or audible cues to the customer that indicates (1) successful biometric authentication of a customer and (2) cryptographic authentication of the authenticity of a remote website, thereby improving and contributing to online transactions security. It is yet another related object, to provide an ITA apparatus for transmitting a cryptographically encapsulated data message that irrefutably identifies an enrolled customer, while identifying the apparatus and biometrically authenticating the customer. It is another related object, to provide an ITA which can successfully respond to a cryptographic challenge issued by one or more external systems, such as one or more authentication service providers or, one or more financial institutions. It is another related object that such communications are performed end-to-end between the ITA apparatus and external systems such that no other interim processing of the message is necessary or possible.

It is another primary object, to provide an ITA system and method for organizing and deploying a plurality of user-authenticating ITA devices administered and controlled by an ITA administration system and system administrator. It is a related object, to provide a system and method for deploying ITAs in conjunction with centrally-and/or remotely-administered hosts and/or merchant systems. It's a related object, to provide methods and systems for administering ITAs, for logging ITA transactions, for issuing cryptographic challenges to individual ITA apparatuses in response to customer-initiated transaction requests, for verifying responses to issued cryptographic requests, and for interfacing with application service providers and/or financial institutions to obtain additional transaction authentication, payment, and transaction processing details.

It's a related object to provide a wireless version of the ITA which is capable of securely communicating with merchant point-of-presence transactions processing machines and upstream external systems.

It is yet another primary object, to provide a mobile ITA apparatus having a USB port interface comprising a USB connector for interconnecting with standard USB interfaces (e.g., a PC-based USB port, a PDA-based USB port, a cellular phone or smartphone USB port, or other USB interface device).

It is another primary object of the present invention, to provide an ITA apparatus, methods, and systems which are capable of providing a "Card Present" equivalent level of assurance of legitimacy of an ITA transaction, to provide assurances equal to or better than an actual physical "Card Present". NB: "Card Present" transactions are those where a physical card is presented in person by a customer directly at the point of sale, thereby justifying lower card transaction fees due to reduced risk.

SUMMARY OF THE INVENTION

An Internet Transaction Authentication (ITA) apparatus is disclosed. One preferred embodiment employs a small-form-factor enclosure with a USB interface connector. Other communications mechanisms are available, such as wireless communications.

One key, differentiating aspect of the invention relates to the transaction completion capabilities of the ITA: Instead of making requested customer transactions under control of programs in a customer PC and/or in a Merchant computer, PC, and/or other processing intermediary or external system, the ITA itself performs the customer's identification and transaction confirmation of the customer's acceptance of the transaction.

Except for the destination financial institution and/or application service provider (e.g., an authentication service provider) interfaces, the ITA-initiated biometric authentication, ITA-authenticated customer authentication and cryptographic transaction protection is 100% consummated in the ITA, itself. Transactions can be initiated either by customers or by merchants, depending on the application.

The ITA is capable of initiating and authenticating any financial transaction. The complete transaction sequence is cryptographically encapsulated for transport all the way from within the ITA to the financial organization that authorizes payment to the merchant. This cryptographic encapsulation is impervious to software threats in the customer's computer and on the Internet and provides a "Card Present" level of transaction security due to positive customer identification.

The ITA is deployed as a stand-alone personal authenticator and/or as an extra layer of transaction security, and is complementary to existing security regimens. In one embodiment, the ITA plugs into a USB port on desktop PCs, laptop PCs, tablet PCs, "smartphones", and/or other compatible devices having USB ports. In an alternate embodiment, the ITA wirelessly transmits and receives data messages to and from a host computer's USB transceiver, which may be either built into the host, or implemented with an add-on USB transceiver.

The ITA apparatus also improves security of other transactions amenable to the features and benefits of the ITA apparatus.

An "E-Commerce"-oriented online application and system is also disclosed, which implements and uses the ITA apparatus, followed by credit or debit card processing between the website and the clearinghouse. A method for using and deploying an ITA apparatus is disclosed, as well as a method for organizing and interfacing a plurality of ITAs to form an ITA system.

BRIEF DESCRIPTION OF THE FIGURES AND REFERENCE NUMERALS

BRIEF DESCRIPTION OF FIGURES

FIG. 1A shows two views of the ITA apparatus, in USB dongle form

FIG. 1B shows a view of the ITA apparatus in a wireless embodiment

FIG. 2 shows transaction flow between ITA, host computer, Internet, website and a bank or financial processing center FIG. 3 Provides a simplified example of the data between the customer, ITA and the website.

FIG. 4 shows a simple example of a flow chart for an authenticating transaction between a website and the ITA FIG. 5 illustrates an Authentication Service Provider (ASP) model in which a third party service handles the authentication transaction and identifies the ITA and the customer to the website. A financial institution is also shown to illustrate financial transactions.

FIG. 6 is a table of a sequence of transaction steps to authenticate a customer to a website, for example, to enable access to the customer's account.

FIG. 7 is a table of a sequence of transaction steps to authenticate a customer to a website, and process a credit card transaction.

REFERENCE NUMERALS

10 Electronic enclosure body of the ITA (customer authentication apparatus)
12 USB connector extending from the body
14 Fingerprint sensor array
16 Processor for USB interface, biometrics and transaction processing
18 Green LED
20 Red LED
22 Printed circuit substrate or PCB for ITA components
24 Battery for the ITA in wireless card form
26 Local radio circuit and internal loop antenna in wireless card form
102 Internet Transaction Authenticator (ITA) apparatus
104 Customer's PC connected to the Internet
106 Internet website server system (here indicated by a cash register style)
108 Authentication Service Provider (ASP)
110 Bank and/or other financial intermediary and/or card transaction processor(s)

DETAILED DESCRIPTION OF THE PREFERRED EMBODIMENT

Referring now to FIG. 1A, two different views of the USB dongle version of the ITA apparatus are shown. The electronics enclosure body 10 of the ITA is commonly fabricated from high-impact plastic or other durable material. Body 10 includes embedded electronics, including at least one printed circuit board (PCB) or printed circuit substrate such as circuit substrate 22, upon which ITA components are populated. On the substrate 22, components include at least one processor or microcontroller such as processor 16. To provide motive force for the ITA, a power supply interface 24 is coupled to substrate 22; processor 16 is also coupled to power supply interface 24. It must be noted, that power supply interface 24 (not explicitly shown) derives power via the USB connector interface insertion into the USB port on the Host PC or Merchant PC external system.

The processor 16 is multifunctional, providing USB interface processing, fingerprint biometrics processing, transactions processing, and other processing, based on the configuration implemented. Resident within and executing within the processor 16, is transaction security software. Processor 16 also contains memory for the execution of programs plus communications buffers for sending and receiving data. Protected non-volatile memory retains the ID of the ITA and its' cryptographic key(s). Optionally, there can be protected memory available to the customer so that the ITA can additionally serve as a virtual disk drive as is commonly done with USB dongles.

The ITA's USB external interface is implemented in USB connector 12. Connector 12 extends out from the main body 10 of the ITA, and connector 12 is also coupled into the circuit substrate 22 and power supply 24.

Additionally, a biometric fingerprint authentication component is provided, such as integrated fingerprint sensor array 14, which is also coupled into substrate 22). In the embodiment shown in FIG. 1, there are also a plurality of light-emitting diodes, LED 18 and LED 20, which are coupled to the fingerprint sensor array 14, processor 16, and which are mounted on substrate 22. Alternatively, a visual indicator cue could be provisioned using a built-in LCD display on the ITA; in this case, a predetermined symbol or message can appear to indicate successful biometric authentication of a customer and successful cryptographic authentication of a website.

In operation, the ITA is brought to whatever location and target machine it is intended to be used with by the person enrolled by an ITA system administrator. When an enrolled person is ready to initiate their transaction, they first insert the ITA USB connector 12 into an available USB port on a target machine. After interconnecting the ITA into the USB interface port, the enrolled person applies their enrolled finger(s) onto the sensor array 14 to authenticate themselves again for matching on the ITA and for subsequent transmission to the target machine. LED 18 turns green and is lit after the enrolled person or user has been successfully authenticated to the ITA. Alternatively, LED 18 may turn yellow when the user has been successfully biometrically authenticated to the ITA; it may then turn green when the identity of a website has been cryptographically authenticated by the website or the authentication service provider. LED 20 is lit red to indicate that the user has not been authenticated by the fingerprint sensor. If the authentication attempt succeeds, then the ITA will securely inform the remote system using the protocols described below.

Transactions can be initiated either by the customer in response to what is seen on a website, or can be initiated by the website detecting that the customer is attempting to use the website.

Referring now to FIG. 5 which shows the connection between the ITA 102, the host computer 104, the internet, the website system which is represented in this image by a merchant cash register 106, the optional authentication service provider 108, and an optional transaction clearinghouse 110, as shown in the transaction flow of FIG. 6, step 1. The customer sees a website indicated in step 1 by a dotted line with arrowheads. The customer then begins to use the website, causing the website to initiate a request for authentication of the customer before proceeding with the website application. In this example, the website merchant has elected to use an application service provider (ASP) to create a time-varying challenge that is sent unmodified via the internet through the host computer to the ITA. Optionally, the challenge concatenated with known data can be encrypted under the user (ITA) key, the corresponding key of which is at the ASP, and this can be decrypted by the ITA using its' key to regenerate the known data. If this known data is correct, then the ITA can, using its' indicator light, inform the customer that he is performing the transaction with a website known to the ASP, thereby preventing the customer from further communication with a bogus website which is not known to the ASP.

If the user has achieved successful biometric authentication to the ITA, then the ITA will encrypt a packet of data containing the challenge concatenated with the identity of the ITA and an indication of the results of the authentication. This packet is then transmitted without modification via the host computer 104 and the internet to the authentication service provider 108. The ASP looks up in its database a key corresponding to the key in the ITA and uses this key to decrypt the packet. If the decrypted data contains the original challenge and indicates proper authentication, then the ASP has verified that the identity of the ITA and the identity of the customer and returns this information to the website 106.

At the completion of this transaction, the website is now able to proceed with either logon or a financial transaction. The financial transaction may entail a credit card transaction with a clearinghouse, which may be performed using existing protocols such as EMV or SET (as shown in FIG. 6).

By contrast, a transaction may be initiated by the customer in which case the transaction arrows of FIGS. 6 and 7 are reversed (indicating the opposite flow of data). If the customer has been biometrically authenticated to the ITA, then the ITA may send a packet of data containing a challenge, the results of the biometric authentication, and a unique number corresponding to an enumerated ITA to the ASP. The ASP will then issue a response to this challenge using a packet encrypted with a key corresponding to the key in the ITA, and the ITA will then decrypt this to cryptographically authenticate the ASP (and by implication the website). It will then illuminate the LEDs to indicate that the customer has been successfully authenticated to the ASP and that the website is known the ASP, and hence is presumably safe. The ASP then so informs the website that the transaction was successful, so that the website can proceed with its' transaction.

FIG. 1B shows a view of the ITA apparatus 10, in a wireless version. The figure and reference numbers are the same as the USB model in FIG. 1A except for a change in physical form from that of a stick-type enclosure to a card or similar form, and the replacement of the USB interface with a radio circuit such as a Bluetooth or ZigBee chip with antenna 26. The fingerprint sensor 14, LED 18, LED 20 and processor 16 are the same as FIG. 1a. The wireless version may also require a battery 24 to provide power, or alternatively, may use sources such as radio frequency energy or solar energy.

FIG. 2 shows transaction flow between ITA 102, host computer, a website symbolized here by a transactions terminal 106, and a bank or financial processing center where the website or the bank performs the back-end processing for authentication described in the procedure below. This is a simplified drawing that does not use a separate authentication service provider and does not describe credit card processing.

FIG. 3 Provides a simplied example of the data that is either transacted between the customer's ITA and the website or between the customer's ITA and the bank, depending upon which entity performs customer authentication.

FIG. 4 shows a simplifying example of a flow chart for an authenticating transaction between a website (described in the FIG. 4 as a merchant and indicated by the transaction terminal or cash register 106 and the ITA 102. The steps are the same as steps 1 through 4, in the section below.

FIG. 5 illustrates an Authentication Service Provider (ASP) model in which a third party service handles the authentication transaction and identifies the ISP holder to the Merchant. A financial institution is also shown to illustrate financial transactions.

FIG. 6 is a table of a sequence of transaction steps to authenticate a customer to a merchant, for example, to enable access to the customer's account. This transaction flow has been described in the description in the FIG. 1A and a financial transaction example is provided in FIG. 7.

FIG. 7 shows a Transaction Flow Table where and Authenticated Service Provider is part of the transaction process and process a credit card transaction. The following steps are performed to carry out authentication. There are no authentication steps performed on the customer's host computer and no data is passed through the host computer and the Internet except in cryptographically protected form.

Step Operation/Result/Action:

Step 1 For example, the customer accesses a host website on Host Computer 104 to conduct investment transactions or purchase items from a web shopping cart of website Merchant 106. The website 106 requests that the Authentication Service Provider (ASP) 108 issue a customer authentication request. The merchant's request may contain the web address of the customer. The Authentication Service Provider 108 sends a random or time-varying challenge to the ITA 102 (as is well known to the art, e.g., ISO/IEC a 9798-2, which describes challenge/response security techniques). This encrypted challenge, using standards known to the arts, such as FIPS 197, AES (advanced encryption standards) is different for every transaction in order to enable the system to detect and prevent replay attacks.

Step 2 In the following discussion in FIGS. 5 through 7, we will refer to the website as the "merchant" as one example of a possible website. The customer responds to the challenge of Step 1 by inserting an ITA 102 into a USB port and placing a finger on the biometric sensor (if that hasn't already been done). The ITA biometrically authenticates the customer and cryptographically authenticates the message received from the website merchant or an Authentication Service Provider (ASP) 108. There corroborations enable the ITA to proceed with the transaction. If the fingerprint check is successful and the challenge from the cryptographic ASP can be cryptographically verified, then a light (e.g., an LED or other visual cue or indicator) will be lit to notify the customer that the transaction may proceed. Note that the Host Computer 104 and the internet are not parties to the transaction except to relay and pass the request packet through to the ASP 108.

Step 3 Using its unique cryptographic key, the ITA 102 encrypts the challenge along with an ITA-ID, customer authentication information, and optionally a credit card number, and returns this encrypted information to the merchant website or ASP 108. The ASP 108 is the only party that knows the cryptographic key that is securely stored within the ITA 102. The key cannot be read out of the secure internal storage of the ITA and the key is never transmitted for any reason.

Step 4 The ASP 108 decrypts the packet information, checks the ITA-ID and challenge to determine if it matches what was sent to the ITA. If it does, then the identity of the ITA 102 has been cryptographically authenticated and because the ITA was enabled, the identity of the customer has also been biometrically authenticated. The ASP 108 then uses the authenticated identity of the customer and the merchant to send an acknowledgement of the transaction to the Merchant 106. The ASP 108 has now completed its tasks.

Step 5 The Merchant 106 may optionally verify the account with the Bank or credit card organization 110 and, if the transaction is authorized, displays an acknowledgement to the Customer on the web site and complete the transaction. The Merchant is now committed to the transaction because the customer has non-reputably and digitally "signed" the authorized transaction using a cryptographically validated ITA, thereby proving his or her identity. This authentication provides the logical equivalent of a signed, physical "Card present" transaction.

Step 6 If this was a credit card transaction, then the Merchant organization will authenticate itself to the Bank 110 using standard financial protocols and complete the credit card payment process.

There are two kinds of service provided by the Authentication Service Provider (ASP). In the case described above, the Customer's ITA provided the credit card number in a secure, encrypted protocol such as EMV and the ASP only provided positive authentication of the identities of the Customer and the keyed ITA.

Alternatively, the ASP can provide the credit card number if the number has been previously enrolled in its secure database.

Based on the foregoing disclosures, various embodiments of the present invention have been articulated. It should be obvious to one skilled in the art that various aspects of the invention can be changed without changing the scope or impact of the invention. Furthermore, it should also be noted that the present invention integrates all transactions processing tasks normally performed in end-to-end systems in multiple different software and hardware products, within one enclosure and without any additional processing. Also, various embodiments of the ITA may include other displays than LEDs.

I claim:

1. A biometric customer authentication apparatus for improving online transaction security and for assuring the identity of a customer, comprising:

an electronic enclosure including a fingerprint sensor disposed thereupon and further including an external communications interface;

at least one processor comprised within said enclosure and coupled to said fingerprint sensor;

transaction security software resident within and executing on said at least one processor further comprising biometric fingerprint authentication software for authenticating authorized customers and also comprising cryptographic transaction authentication software for authenticating transactions;

at least one of a memory and a communications buffer coupled to said at least one processor and further coupled to said external communications interface; and a communications subsystem coupled into said external communications interface for relaying data messages between at least one external system and said apparatus.

2. The apparatus of claim 1, wherein said external communications interface further comprises a physical interface connector for physical insertion into an external interface port disposed upon one of a host system and said at least one external system.

3. The apparatus of claim 2, wherein said external communications interface further comprising said physical interface connector, further comprises a USB connector for insertion into an external interface port disposed upon one of said host system and said at least one external system.

4. The apparatus of claim 1, wherein said external communications interface further comprises a first wireless transceiver for wirelessly communicating with a second wireless transceiver communications interface aboard one of a host system and said at least one external system.

5. The apparatus of claim 1, wherein said at least one of a memory and a communications buffer is further adapted for storing and retrieving data and for communicating data messages between said apparatus and said at least one external system via said external communications interface.

6. The apparatus of claim 1, further adapted for cryptographically encapsulating said data messages into secure data messages to effectuate secure data transmission including sending said secure data messages to said at least one external system only after completion of biometric fingerprint authentication by said customer initiating said transaction.

7. A method for securely processing and responding to a website-initiated transaction authentication request, comprising the steps of:
(1) receiving in a customer authentication apparatus said website-initiated transaction authentication message for cryptographically confirming the web site's identity and for requesting said apparatus provide a corroborating response including a biometric authentication of an enrolled customer and further including a cryptographic encapsulation of said response in order to prove that said response originates from a legitimate customer;
(2) biometrically authenticating said customer by said customer authentication apparatus prior to transmitting said response to said request;
(3) performing said cryptographic encapsulation of said response by said customer authentication apparatus only after successful completion of said biometric authentication of said customer using fingerprint biometrics;
(4) transmitting said response to said request; and
(5) verifying by at least one of said website and at least one external system that said response satisfactorily authenticates said customer.

8. The method of claim 7, wherein said step of performing cryptographic encapsulation of said transaction authentication response by said customer authentication apparatus also includes the step of explicitly identifying said customer authentication apparatus.

9. The method of claim 7, wherein said step of transmitting said transaction authentication response further comprises transmitting said cryptographically encapsulated secure data message by an external communications interface comprising an external interface connector disposed upon said customer authentication apparatus after said external interface connector has been inserted into an external interface port on an external system.

10. The method of claim 7, wherein said step of transmitting said transaction authentication response further comprises transmitting said cryptographically encapsulated secure data message by an external communications interface comprising a wireless transceiver comprised within said customer authentication apparatus after said apparatus is within range of an external system having a wireless transceiver communications interface.

11. The method of claim 7, wherein said step 1of cryptographically authenticating that said request originates from a legitimate customer and step 2of biometrically authenticating said customer is indicated by means of at least one of a visual indicator cue and an audible indicator cue and a displayed indicator cue.

12. The method of claim 11, wherein said visual indicator cue comprises at least one of lighting a light emitting diode and lighting a general purpose indicator light and displaying a visual indicator cue on a display.

13. The method of claim 11, wherein said audible indicator cue comprises the sounding of at least one of a beep tone and a chime tone.

14. The method of claim 11, wherein said displayed indicator cue further comprises at least one of a predetermined indicator legend cue and a predetermined symbol cue and a predetermined image cue.

15. A method for generating a customer-initiated transaction request from an authorized customer initiating said request, comprising the steps of:
(1) biometrically authenticating said customer using a customer authentication apparatus prior to transmission of said customer-initiated transaction request;
(2) processing, assembling, and cryptographically encapsulating an assertion of a successful biometric authentication of said customer and a provision of a time-varying parameter to prevent replay attacks encapsulated therewithin prior to transmission thereof;
(3) transmitting by said customer authentication apparatus said cryptographically encapsulated request to at least one external system further comprising at least one of a website and an authentication service provider;
(4) receiving by said at least one external system said request and verifying that said request originated from an authenticated customer;
(5) responding to said request using a secure data message comprising a cryptographic transaction authentication response and transmitting said response to said customer authentication apparatus;
(6) receiving and verifying by said customer authentication apparatus that said response to said request represents a response from a legitimate website; and
(7) actuating at least one of a visual indicator cue and an audible indicator cue and a displayed indicator cue on said transaction authentication apparatus indicating that said response has been received from a legitimate website.

16. The method of claim 15, wherein said step 1 of cryptographically authenticating that said request originates from a legitimate customer and step 2 of biometrically authenticating said customer is indicated by means of at least one of a visual indicator cue and an audible indicator cue and a displayed indicator cue.

17. The method of claim 16, wherein said visual indicator cue comprises at least one of lighting a light emitting diode and lighting a general purpose indicator light and displaying a visual indicator cue on a display.

18. The method of claim 16, wherein said audible indicator cue comprises the sounding of at least one of a beep tone and a chime tone.

19. The method of claim 16, wherein said displayed indicator cue further comprises at least one of a predetermined indicator legend cue and a predetermined symbol cue and a predetermined image cue.

20. A method for improving online transaction security, the steps comprising:
(1) enrolling a person into a customer authentication apparatus;

(2) deploying said person and said customer authentication apparatus together at an external system where at least one transaction can be generated;

(3) communicating between said customer authentication apparatus and said external system;

(4) authenticating said person by said customer authentication apparatus while said apparatus is communicating with said external system;

(5) initiating and generating of said at least one request by said person after said apparatus has authenticated said person;

(6) transmitting a request message indicating that said person was authenticated by said apparatus and that said transaction was initiated by an authenticated person; and (7) receiving in said host system said authenticated-person-initiated-transaction message.

21. A system for initiating, authenticating and completing transactions by at least one customer using a biometric customer authentication apparatus, comprising:

said at least one customer enrolled into said customer authentication apparatus;

said customer authentication apparatus including (i) a fingerprint sensor coupled to a processor, (ii) an external communications interface adapted for communicating with at least one external system, and (iii) transaction security software resident within and executing on said processor and further comprising biometric fingerprint authentication software for authenticating authorized customers and also comprising cryptographic transaction authentication software for authenticating transactions;

said at least one external system adapted for communicating with said customer authentication apparatus and having at least one of a physical external communications interface port and a wireless communications interface for receiving secure data messages; and at least one transaction processing application residing within said at least one external system including at least one part of a web application accessed by said at least one external system adapted for transmitting and receiving requests and responses to and from said customer authentication apparatus.

22. The system of claim 21, wherein a trusted third party Authentication Service Provider performs authentication services on behalf of at least one customer authentication apparatus and said at least one external system.

23. The system of claim 21, wherein said customer authentication apparatus communicates with an external system by means of a USB interface connector.

24. The system of claim 21, wherein said transaction authentication apparatus communicates with an external system by means of a wireless communications link.

* * * * *